United States Patent
Schlenker

(10) Patent No.: US 11,111,639 B2
(45) Date of Patent: Sep. 7, 2021

(54) CONSTRUCTION MACHINE WITH ROTOR LOAD MONITORING

(71) Applicant: Caterpillar Paving Products Inc., Brooklyn Park, MN (US)

(72) Inventor: Brian J. Schlenker, Shoreview, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 30 days.

(21) Appl. No.: 16/506,737

(22) Filed: Jul. 9, 2019

(65) Prior Publication Data

US 2021/0010213 A1  Jan. 14, 2021

(51) Int. Cl.

| | |
|---|---|
| *E01C 23/088* | (2006.01) |
| *E01C 23/12* | (2006.01) |
| *F16H 7/12* | (2006.01) |
| *E01C 23/06* | (2006.01) |
| *G01L 5/08* | (2006.01) |
| *G01M 13/023* | (2019.01) |

(52) U.S. Cl.
CPC .......... *E01C 23/088* (2013.01); *E01C 23/127* (2013.01); *E01C 23/065* (2013.01); *F16H 7/12* (2013.01); *G01L 5/08* (2013.01); *G01M 13/023* (2013.01)

(58) Field of Classification Search
CPC ........... F16H 2007/0887; F16H 7/0827; F16H 2007/0812; F16H 2007/0861; F16H 2007/0885; F16H 7/1281; F16H 7/12; E01C 23/088; E01C 23/127; G01L 5/08; G01M 13/023

USPC .................................. 299/1.5; 474/110, 135
See application file for complete search history.

(56) References Cited

U.S. PATENT DOCUMENTS

| | | | | |
|---|---|---|---|---|
| 3,108,387 | A | * | 10/1963 | Penote ...................... E02F 9/24 37/348 |
| 4,929,121 | A | * | 5/1990 | Lent ...................... E01C 23/088 299/1.5 |
| 7,353,105 | B2 | | 4/2008 | Mino et al. |
| 2007/0286678 | A1 | * | 12/2007 | Berning ................ E02F 3/8155 404/90 |
| 2011/0193397 | A1 | * | 8/2011 | Menzenbach ......... E01C 23/088 299/1.5 |

(Continued)

FOREIGN PATENT DOCUMENTS

| | | |
|---|---|---|
| JP | H07189764 | 7/1995 |
| JP | 2006307486 | 11/2006 |

*Primary Examiner* — Janine M Kreck
*Assistant Examiner* — Michael A Goodwin
(74) *Attorney, Agent, or Firm* — Schwegman, Lundberg & Woessner

(57) ABSTRACT

A machine for road work for road work, the machine can comprise: a frame, a drive system including a power source carried by the frame, a milling system driven by the power source and a controller. The milling system can comprise: a rotor configured to rotate and remove an amount of material from a working area; a drive member coupling the rotor to be driven by the power source; a tensioner assembly configured to tension the drive member; and a sensor configured to measure the tension of the drive member. The controller can be configured to, in response to a signal received from the sensor, determine if the rotor has encountered an object capable of damaging the rotor.

19 Claims, 5 Drawing Sheets

(56) References Cited

U.S. PATENT DOCUMENTS

| | | | |
|---|---|---|---|
| 2011/0266858 A1* | 11/2011 | Laux | A01B 79/005 299/1.5 |
| 2014/0348585 A1* | 11/2014 | Nacke | E01C 23/088 404/75 |
| 2016/0168807 A1* | 6/2016 | Schafer | E01C 23/088 701/51 |
| 2017/0138004 A1* | 5/2017 | Berning | E01C 23/127 |

* cited by examiner

CONSTRUCTION MACHINE WITH ROTOR LOAD MONITORING

TECHNICAL FIELD

The present application relates generally, but not by way of limitation, to methods and systems for construction machines, such as rotary mixer machines and cold planar machines. More particularly, the present application relates to systems and methods for monitoring load on a rotor of such machines.

BACKGROUND

Rotary mixers can be used to recycle old or degraded pavement for reuse on the surfaces. Cold planer machines can be used to remove old or degraded pavement from surfaces such as roadways and parking lots. The surfaces in such working areas can extend over various terrains including surfaces that have grades (slopes) from the horizontal. As such, these machines can include systems for adjusting the vertical height of the machine and a rotary cutting tool attached thereto in order to, for example, control the cutting depth during milling operations.

U.S. Pat. No. 7,353,105, entitled "Engine Control Device for Construction Machinery" discloses construction machines that have switchable engine mode between normal operation and energy saving. Japanese Patent Application No. 07189764 discloses construction machines that adjust engine horsepower for work load to prevent engine stalling.

SUMMARY OF THE INVENTION

A machine for road work for road work, the machine can comprise: a frame, a drive system including a power source carried by the frame, a milling system driven by the power source and a controller. The milling system can comprise: a rotor configured to rotate and remove an amount of material from a working area a drive member coupling the rotor to be driven by the power source; a tensioner assembly configured to tension the drive member; and a sensor configured to measure the tension of the drive member. The controller can be configured to, in response to a signal received from the sensor, determine if the rotor has encountered an object capable of damaging the rotor.

A method of monitoring a rotor of a working machine, the method can comprise: providing a drive member coupling the rotor to be driven by a drive system of the working machine; sensing a pressure indicative of a tension of the drive member; and determining if the rotor has encountered an object capable of damaging the rotor based upon the sensing the pressure.

A system that can comprise: a frame, a drive system including a power source, a milling system driven by the power source and a controller. The milling system can comprise: a rotor configured to rotate and remove an amount of material from a working area, a belt configured to couple the rotor to be driven by the power source, and a first sensor configured to measure a pressure of a hydraulic cylinder tensioning the belt. The controller can be configured to, in response to a signal received from the first sensor, determine if the rotor has encountered an object capable of damaging the rotor.

DETAILED DESCRIPTION

Figure 1:
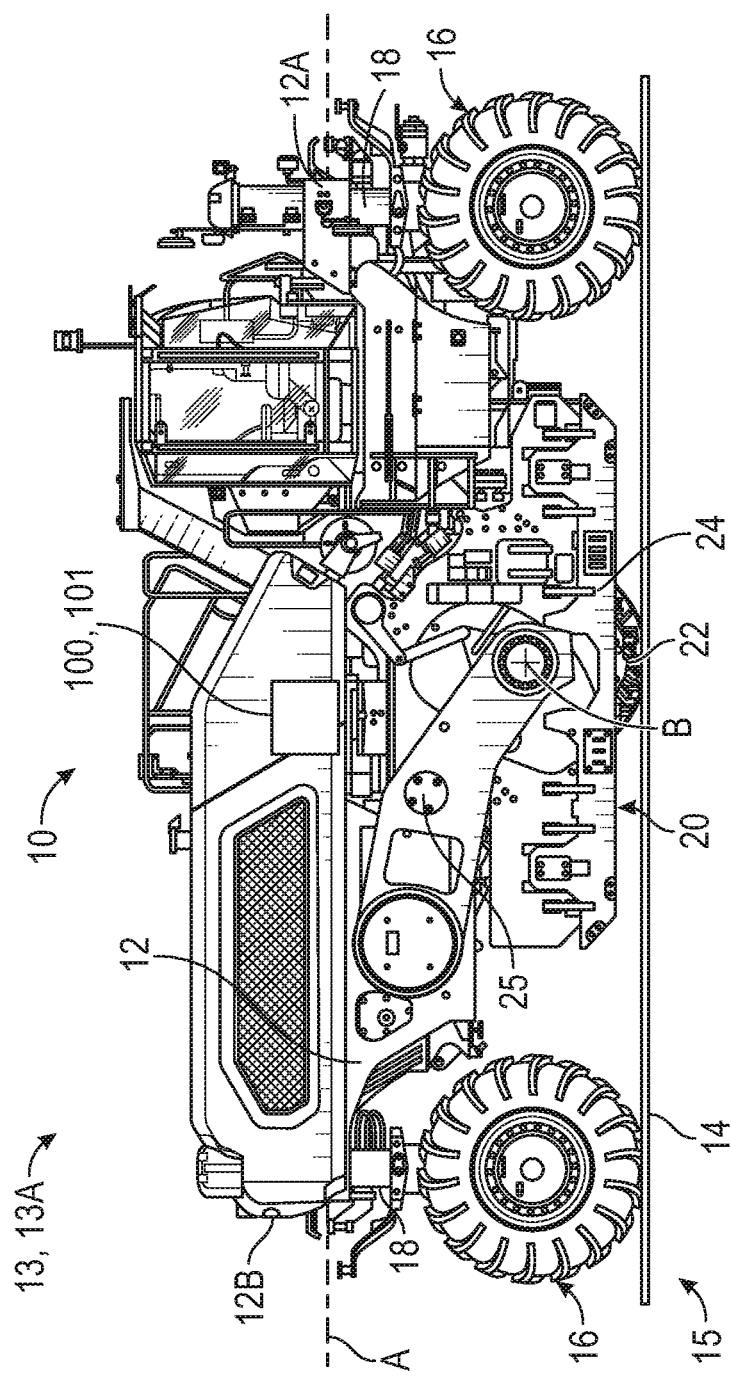
FIG. 1 is a schematic side view of a rotary mixer machine according to an example of the present application.

FIG. 1 is a schematic side view of rotary mixer machine 10 showing frame 12 to which a drive system 13 including a power source 13A and transportation devices (wheels) can be connected. The transportation devices 16 can be connected to frame 12 via a plurality of legs 18 (also referred to as lifting columns herein). The rotary mixer machine 10 has a milling system 20 that is coupled to the underside of frame 12 between transportation devices 16. Although the present application is described with reference to a rotary mixer machine, the present invention is applicable to other types of industrial machines, such as cold planer machines.

The frame 12 can longitudinally extend between front end 12A and rear end 12B along frame axis A. The power source 13A can be provided in any number of different forms including, but not limited to, internal combustion engines, Otto and Diesel cycle internal combustion engines, electric motors, hybrid engines and the like. Power from the power source 13A can be transmitted to various components and systems of the drive system 13, such as the transportation devices 16, one or more of the plurality of legs 18, the milling system 20 and a controller 100.

The frame 12 can be supported by the transportation devices 16 via the legs 18. Although shown as wheels, the transportation devices 16 can be any kind of ground-engaging device that allows rotary mixer machine 10 to move over a surface 14 within a working area 15. Thus, the surface 14 and working area 15 can be, for example, a paved road or a ground already processed by rotary mixer machine 10. Thus, in alternative embodiments, the transportation devices 16 could be configured as track assemblies or crawlers. The transportation devices 16 can be configured to move rotary mixer machine 10 in a forward travel and a backward travel along the ground surface in the direction of axis A. The legs 18 can be vertically moveable (i.e. configured to raise and lower the frame 12 and rotor 22 (also referred to as a drum)) relative to the transportation devices 16 and the surface 14. The legs 18 can be configured to rotate to provide steering for the rotary mixer machine 10.

The legs 18 can each comprise actuators such as a hydraulic lifting column configured to raise and lower frame 12 to, for example, set a desired cutting depth of the rotor 22 of the milling system 20 and to raise the frame 12 and rotor 22 to accommodate rotary mixer machine 10 engaging obstacles on the ground. These obstacles can be sensed or otherwise determined using the monitoring system 101 and techniques that can be used with the controller 100 as discussed subsequently. In some cases, the front two legs can operate independent of each other while the rear legs can be tied together with pressure balance and raise and lower together. Thus, the legs 18 can be vertically moveable legs configured to (in combination with the controller 100) maintain a desired attitude of the frame 12 and the rotor 22 relative to the surface 14 of the working area 15.

As described herein, one or more of the plurality of legs 18 can be coupled to a hydraulic system that can be operated by the controller 100 receiving feedback with the monitoring system 101, techniques and/or one or more sensors (e.g., one or more hydraulic pressure sensors used as drive member tension sensor(s), belt pulley speed sensor(s), drive member speed sensor(s), torque sensor(s) or combinations thereof).

The milling system 20 can be connected to the frame 12 and can be part of the drive system 13 of the machine 10. The milling system 20 can comprise the rotor 22, a housing 24 and a milling system actuator 25. The rotor 22 (sometimes called a milling drum or drum) is rotatable relative to the frame 12 and the surface 14 and is operatively connected to be driven by the power source. The rotor 22 can include a plurality of cutting tools, such as chisels or bits, disposed thereon. The rotor 22 can be rotated within the housing 24 about axis B extending in a direction perpendicular to frame axis A into the plane of FIG. 1. As rotatable milling drum 22 spins or rotates about axis B, the cutting tools may engage the surface 14, such as, for example, asphalt, of existing roadways, bridges, parking lots and the like. Moreover, as the cutting tools engage such the surface 14, the cutting tools remove layers of materials forming work surface, such as hardened dirt. The spinning action of the rotor 22 and the cutting tools pulverizes and mixes an existing road surface (surface 14) and a predetermined amount of the underlying material in a rotor chamber formed by the housing 24 to create a new base or a new road surface. Various additives or aggregates can be deposited on surfaces (including surface 14) or within the working area by the action of the rotor 22 and the cutting tools. Thus, the rotary mixer machine 10 of the present application can include systems for depositing an additive, such as Portland cement, lime, fly ash, cement kiln dust, etc., and/or water on the work surfaces during the mixing/pulverizing operations.

Referring now to FIG. 1, the housing 24 forms the chamber for accommodating the rotor 22 and action of the rotor in pulverizing the surface 14. The housing 24 can include front and rear walls, and a top cover positioned above the rotor 22. Furthermore, the housing 24 can include lateral covers, or side plates (these and other components of the milling system 20 are removed in FIG. 2), on the left and right sides of the rotor 22 with respect to a travel direction of rotary mixer machine 10. The housing 24 is open toward the ground so that the rotor 22 can engage the ground from within the housing 24.

The milling system 20 can also include the milling system actuator 25 that can comprise a hydraulic cylinder or another device configured to raise and lower the rotor 22 to selectively disengage, engage, increase or reduce the depth of cut the rotor 22 makes with the surface 14 of the working area 15.

Figure 2:
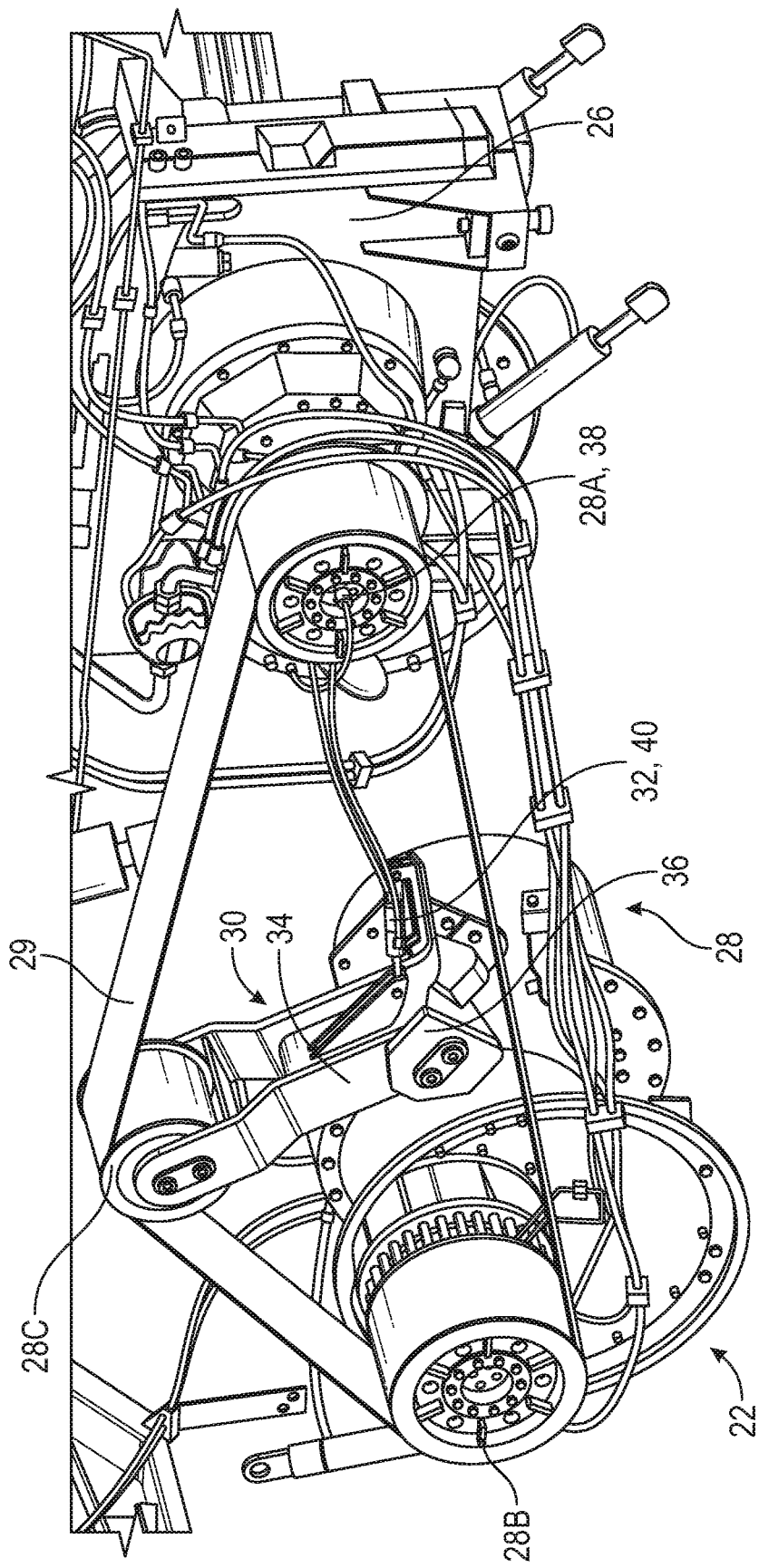
FIG. 2 is a perspective view of part of a milling system of the rotary mixer machine according to an example of the present application.

FIG. 2 shows additional components of the milling system 20 including a gearbox 26, belt pulleys 28, a drive member 29 and a tensioner assembly 30. The tensioner assembly 30 can include a hydraulic cylinder 32. In FIG. 2 components such as the housing 24 and portions of the rotor 22 have been removed.

The gearbox 26 can be mechanically coupled to the drive system 13 (FIG. 1) so as to be driven by the power source 13A. The gearbox 26 includes a belt pulley 28A one of the belt pulleys 28. The belt pulleys 28 are rotatable and can be configured to engage with an interior of the drive member 29. The belt pulley 28A can be coupled to the gearbox 26 for rotation therewith and can act to drive the drive member 29. The drive member 29 can comprise a closed loop belt, chain or other tensioned member fabricated of suitable material(s) and can be configured to loop over and be coupled to a second belt pulley 28B of the rotor 22. The second belt pulley 28B can be one of the belt pulleys 28. Although the term "belt pulley" is used herein it should be recognized that the pulleys can have any configuration suitable for a coupling with drive member 29. Thus, if the drive member 29 is a chain, for example, the pulleys could be gears or another suitable mechanism.

The tensioner assembly 30 can include a third belt pulley 28C, the hydraulic cylinder 32, an arm 34 and a base 36. The base 36 can be coupled to the frame of the rotary mixer machine or to other parts of the milling system 20 such as the housing. The belt pulley 28C can be configured to engage and be coupled with the drive member 29 for rotation with movement of the drive member 29. The tensioner assembly 30 can include the arm 34, which is moveably coupled to the base 36 such as via pins or other mechanical mechanisms. The position of the arm 34 can be moved relative to the base 36 by the hydraulic cylinder 32, which can be coupled to the arm 34 at a first end thereof. For example, the hydraulic cylinder 32 can be extended to pivot the arm 34 relative to the base 36 to put a degree of tension on the drive member 29 via the belt pulley 28C. This degree of tension on the drive member 29 can be adjustable with movement of the arm 34 facilitated by extension/retraction of the end of the hydraulic cylinder 32. Extension/retraction of the end of the hydraulic cylinder 32 can be accomplished by changing a pressure of the hydraulic fluid within the hydraulic cylinder 32.

According to the illustrated embodiment of FIG. 2, the milling system 20 can include at least one pulley sensor 38 and at least one pressure sensor 40. A torque of the gearbox 26, rotor 22 or other portions of the drive system 13 can also optionally be measured by one or more sensor(s) not specifically illustrated in FIG. 2 and can used with the monitoring system 101 and the controller 100.

The at least one pulley sensor 38 can be configured to measure criteria such as a rotational speed, acceleration, etc. of one or more of the belt pulleys 28. From this data, a speed, acceleration, etc. of the drive member 29 can be determined such as by the controller 100 (FIG. 1). Similarly, the at least one pressure sensor 40 can be configured to monitor pressure within the hydraulic cylinder 32. This pressure can be indicative of a tension of the drive member 29. Signals/data from the at least one pulley sensor 38 and the at least one pressure sensor 40 can be transmitted to the controller 100 (FIG. 1). Based upon one or more of these signals, the controller 100 can determine if the rotor 22 has encountered an object capable of damaging the rotor 22. Although the at least one pulley sensor 38 is illustrated in FIG. 2, according to other embodiments other types and locations of sensor can be used to determine the speed, acceleration, etc. of the drive member 29. For example, a distinctive marking(s) can be placed on the drive member 29 and a tachometer or other visual sensor could be utilized to determine speed, acceleration, etc. of the drive member 29 by counting the number of times the marking(s) visually pass within range with movement of the drive member 29. Additionally, although both the least one pulley sensor 38 and the least one pressure sensor 40 are shown in the embodiment of FIG. 2, it is contemplated that only one of these sensors need be used in some embodiments to determine if the rotor has encountered an object capable of damaging the rotor.

Referring again to FIG. 1, one or more aspects of the rotary mixer machine 10, including monitoring system 101 can be managed by one or more embedded or integrated controllers 100 of the rotary mixer machine 10. The controller 100 can comprise one or more processors, microprocessors, microcontrollers, electronic control modules (ECMs), electronic control units (ECUs), or any other suitable means for electronically monitoring and/or controlling functionality of the rotary mixer machine 10.

The controller 100 can be configured to operate according to a predetermined algorithm or set of instructions for monitoring and controlling the rotary mixer machine 10 based on various operating conditions including, for example, input from the at least one pressure sensor 40 and/or the at least one pulley sensor 38.

It is further contemplated that the controller 100 can be configured to continuously perform various calculations such as determining if the rotor has encountered an object capable of damaging the rotor in a dynamic manner in real-time and output these to an interface and/or take other actions.

Such algorithms or set of instructions can be stored in a database and can be read into an on-board memory of the controller 100, or preprogrammed onto a storage medium or memory accessible by the controller 100, for example, in the form of a hard drive, jump drive, optical medium, random access memory (RAM), read-only memory (ROM), or any other suitable computer readable storage medium commonly used in the art (each referred to as a "database").

The controller 100 can be in electrical communication or connected to the milling system 20, drive system 13, or the like and various other components, systems or sub-systems of rotary mixer machine 10. By way of such connection, the controller 100 can receive data pertaining to the current operating parameters of the rotary mixer machine 10 from sensors, such as a torque sensor(s), the at least one pressure sensor 40 and/or the at least one pulley sensor 38, and the like. In response to such input, the controller 100 may perform various determinations and transmit output signals corresponding to the results of such determinations or corresponding to actions that need to be performed, such as producing up and down movements of the legs 18 (thereby raising the rotor 22), raising the rotor 22 with an actuator, or disconnecting the rotor 22 from being driven by the drive system 13 as desired. Thus, the controller 100 can be configured to automatically activate various actuators or perform other actions to protect components such as the rotor 22.

Figure 3A:
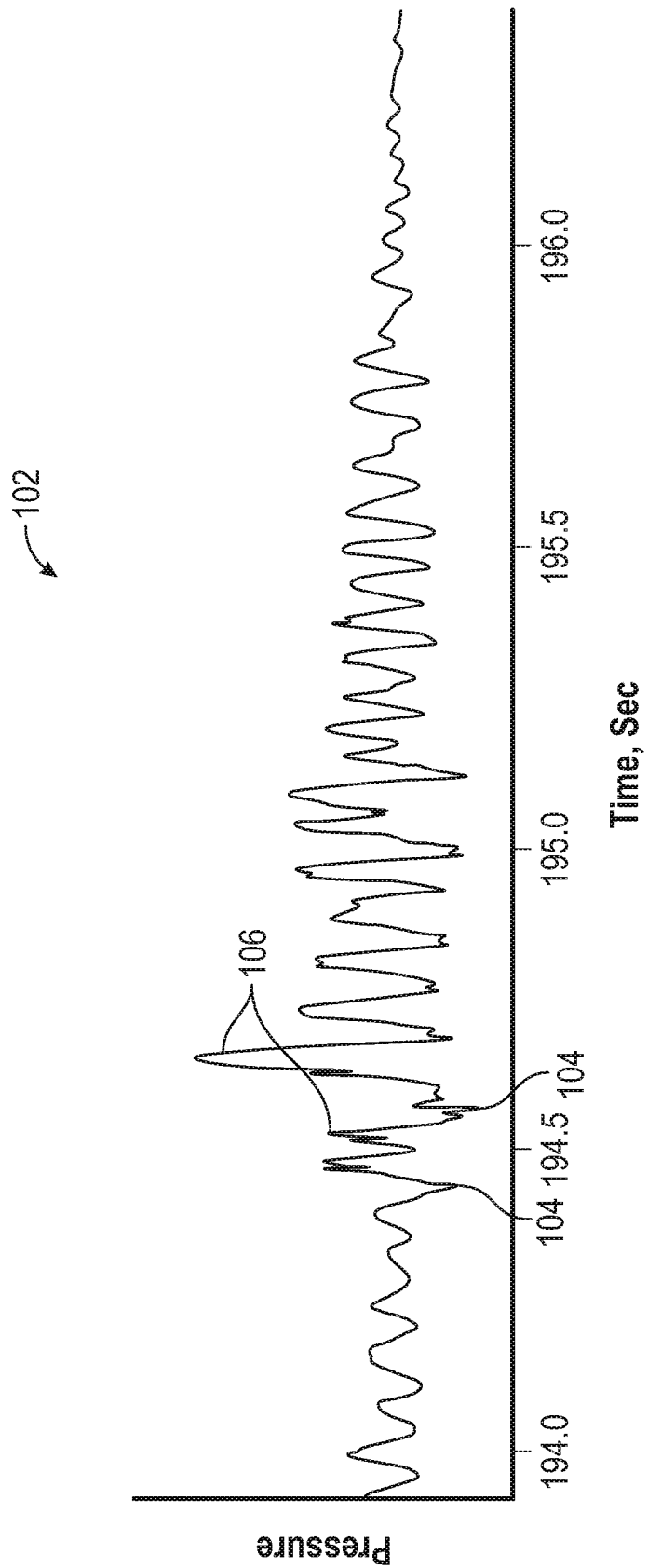
FIG. 3A is a graph of a pressure signal according to an example of the present application.

As shown in FIG. 3A, according to one embodiment the controller 100 can be configured to receive a signal 102 indicative of a pressure within the hydraulic cylinder 32 (FIG. 2). This pressure can be sensed and the signal generated with the at least one pressure sensor 40 (FIG. 2). FIG. 3A shows a graph of the signal indicative of the pressure during the rotor has encountered an object capable of damaging the rotor. As shown in the graph of FIG. 3A, the signal 102 has a region 104 where the pressure of the hydraulic cylinder decreases by 10% or more from a mean pressure when the rotor has initially encountered the object capable of damaging the rotor. The graph also has a region 106 where the pressure increases by at least 25% as compared to the mean pressure. The region 104 and the region 106 occur within 0.2 seconds or less of one another. However, other time intervals between regions 104 and 106 are contemplated based upon operating conditions.

According to one embodiment, the controller 100 can be configured to, in response to the signal 102 received from the at least one pressure sensor 40, determine if the rotor has encountered an object capable of damaging the rotor. For example, the controller 100 can make this determination by determining if the pressure decreases by at least 5%, at least 10%, at least 15%, at least 20%, at least 25%, etc. as compared to the mean pressure. Alternatively or additionally, the controller 100 can make this determination by determining if the pressure increases by at least 10%, at least 15%, at least 20%, at least 25%, at least 30%, at least 35%, at least 40%, at least 50%, at least 60%, at least 75% at least 100%, etc. as compared to the mean pressure. In yet further embodiments, the controller 100 can make this determination by determining if the pressure decreases by at least 5% (or another percentage such as at least 10%, at least 15%, at least 20%, at least 25%) as compared to the mean pressure and the pressure then increases by at least 20% (or another percentage such as at least 10%, at least 15%, at least 25%, at least 30%, at least 35%, at least 40%, at least 50%, at least 60%, at least 75%, at least 100%) as compared to the mean pressure within 0.2 seconds or less or another designated time interval such as, but not limited to (0.025 seconds or less, 0.04 seconds or less, 0.06 seconds or less, 0.08 seconds or less, 0.1 seconds or less, 0.12 seconds or less, 0.14 seconds or less, 0.16 seconds or less, 0.18 seconds or less, 0.22 seconds or less, 0.24 seconds or less, 0.26 seconds or less, 0.28 seconds or less, 0.30 seconds or less, 0.35 seconds or less, 0.4 seconds or less, 0.5 seconds or less, 0.75 seconds or less, 1.0 seconds or less, etc.).

It should be noted that in other contemplated embodiments where the hydraulic cylinder 32 and the tensioner assembly 30 are positioned in a different manner from the arrangement of FIG. 2 (such as an inverted arrangement relative to the arrangement of FIG. 2) that the pressure within the hydraulic cylinder 32 may initially increase if the rotor has encountered an object capable of damaging the rotor. Thus, in such embodiments the controller 100 can be configured to, in response to a signal (such signal being different from that of signal 102) received from the at least one pressure sensor 40, determine if the rotor has encountered an object capable of damaging the rotor. For example, the controller 100 can make this determination by determining if the pressure increases by at least 5%, at least 10%, at least 15%, at least 20%, at least 25%, etc. as compared to the mean pressure. In yet further embodiments, the controller 100 can make this determination by determining if the pressure increases by at least 5% (or another percentage such as at least 10%, at least 15%, at least 20%, at least 25%) as compared to the mean pressure and the pressure then decreases by at least 20% (or another percentage such as at least 10%, at least 15%, at least 25%, at least 30, at least 35%, at least 40%, at least 50%, at least 60%, at least 75%, at least 100%) as compared to the mean pressure within 0.2 seconds or less or another designated time interval such as, but not limited to (0.025 seconds or less, 0.04 seconds or less, 0.06 seconds or less, 0.08 seconds or less, 0.1 seconds or less, 0.12 seconds or less, 0.14 seconds or less, 0.16 seconds or less, 0.18 seconds or less, 0.22 seconds or less, 0.24 seconds or less, 0.26 seconds or less, 0.28 seconds or less, 0.30 seconds or less, 0.35 seconds or less, 0.4 seconds or less, 0.5 seconds or less, 0.75 seconds or less, 1.0 seconds or less, etc.).

Figure 3B:
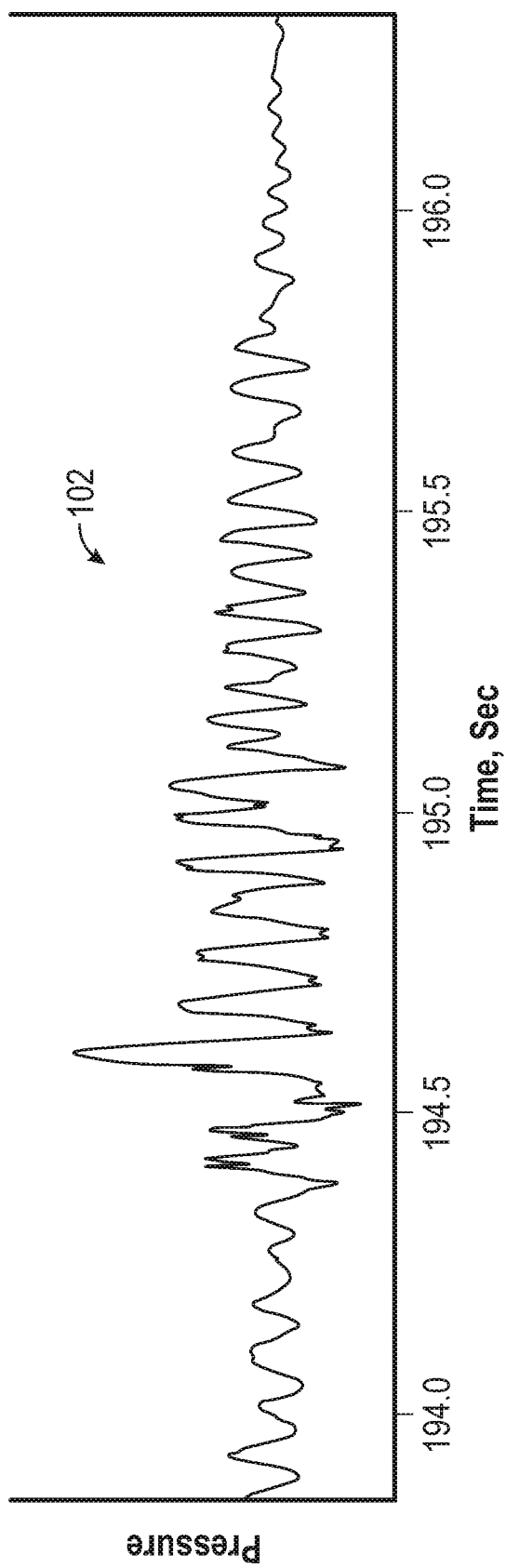
FIG. 3B is a graph of the pressure signal of FIG. 3A and a torque signal according to an example of the present application.
Figure 3B:
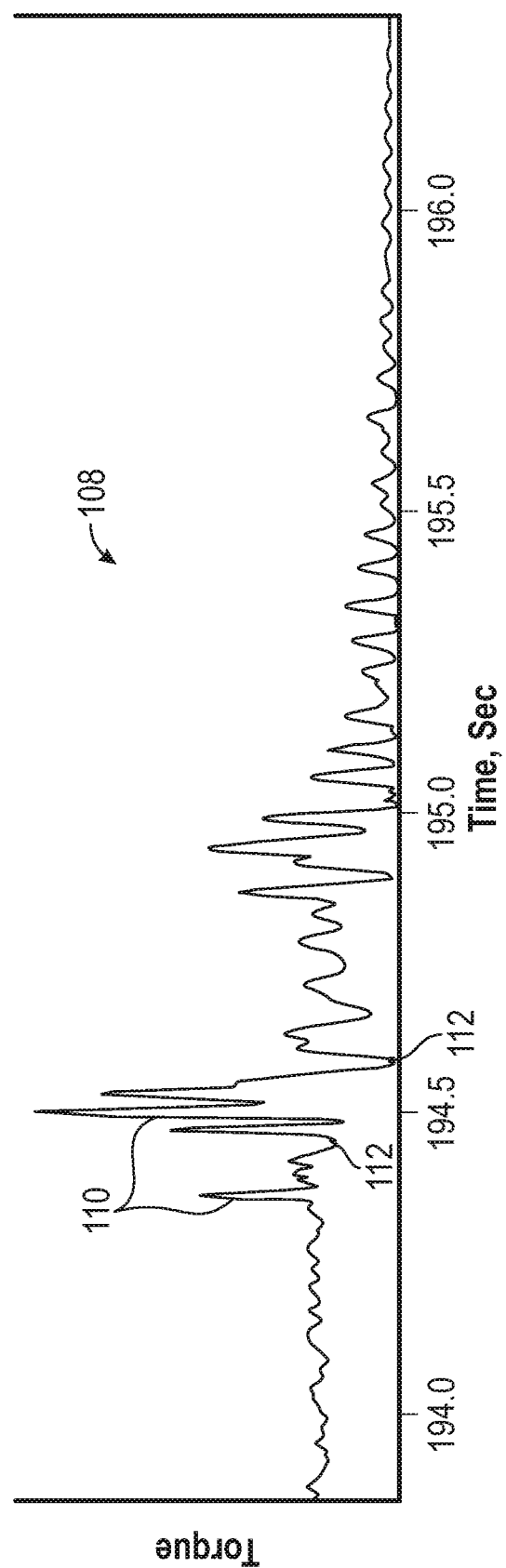

FIG. 3B shows an alternative embodiment where both the signal 102 indicative of the pressure within the hydraulic cylinder 32 (FIG. 2) is graphically shown and a signal 108 indicative of torque of the drive system 13 (FIG. 1) is graphically shown. The signal 108 can be from a torque sensor of the drive system 13 as discussed previously. The signal 108 has a region 110 where the torque of the drive system torque then increases by 50% or more relative to a mean torque when the rotor has initially encountered the object capable of damaging the rotor. The graph also has a region 112 where the torque then decreases by at least 10% from a mean torque or more relative to the mean torque. The regions 110 and 112 occur within 0.2 seconds or less of one another and correspond generally at the same time and over the same time period with the regions 104 and 106 of the signal 102. However, other time intervals between regions 110 and 112 are contemplated based upon operating conditions.

According to one embodiment, the controller 100 can be configured to, in response to the signals 102 and 108 received from the at least one pressure sensor 40 and the torque sensor, determine if the rotor has encountered an object capable of damaging the rotor. For example, the controller 100 can make this determination by determining if the pressure decreases by at least 5%, at least 10%, at least 15%, at least 20%, at least 25%, etc. as compared to the mean pressure and if the torque increases by 50% or more (or another value such as 25% or more, 35% or more, 75% or more, 100% or more, 125% or more, 150% or more, 200% or more, 300% or more, 500% or more, 600% or more, etc.) as compared to a mean torque during a corresponding (substantially the same time and same length of time) time. Alternatively or additionally, the controller 100 can make this determination by determining if the pressure increases by at least 10%, (or another values such as at least 15%, at least 20%, at least 25%, at least 30%, at least 35%, at least 40%, at least 50%, at least 60%, at least 75% at least 100%, etc.) as compared to the mean pressure and the torque decreases by at least 10% (or another value such as at least 5%, at least 15%, at least 25%, at least 50%) as compared with the mean torque during the corresponding time.

Figure 3C:
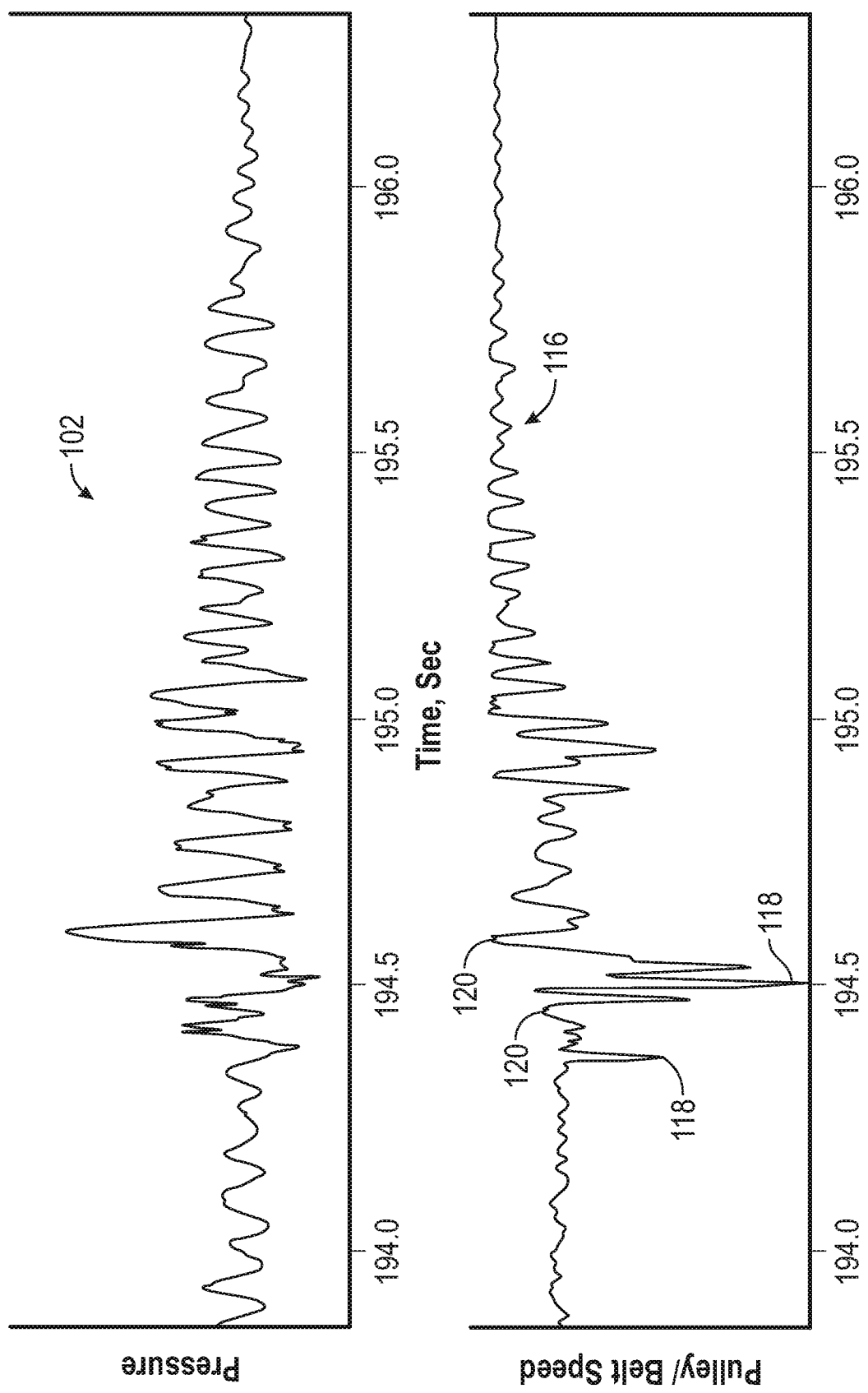
FIG. 3C is a graph of the pressure signal of FIG. 3A and a pulley speed signal according to an example of the present application.

FIG. 3C show yet another alternative embodiment where both the signal 102 indicative of the pressure within the hydraulic cylinder 32 (FIG. 2) is graphically shown and a signal 116 indicative of a speed of the drive member 29 (FIG. 2) is graphically shown. The signal 116 can be from the at least one pulley sensor 38 (FIG. 2) or another sensor as discussed previously. The signal 116 has a region 118 where the speed of the drive member decreases by at least 10% as compared to a mean drive member speed when the rotor has initially encountered the object capable of damaging the rotor. The graph also has a region 120 where the drive member speed increases by at least 10% as compared to the mean drive member speed. The regions 118 and 120 occur within 0.2 seconds or less of one another and correspond generally at the same time and over the same time period with the regions 104 and 106 of the signal 102. However, other time intervals between regions 118 and 120 are contemplated based upon operating conditions According to one embodiment, the controller 100 can be configured to, in response to the signals 102 and 116 received from the at least one pressure sensor 40 and the at least one pulley sensor 38, determine if the rotor has encountered an object capable of damaging the rotor. For example, the controller 100 can make this determination by determining if the pressure decreases by at least 5%, at least 10%, at least 15%, at least 20%, at least 25%, etc. as compared to the mean pressure and if the speed decreases by at least 10% (or another value such as at least 5%, at least 7%, at least 10%, at least 15%, at least 20%, at least 25%, at least 30%, at least 50, etc.) as compared a mean drive member speed during a corresponding (substantially the same time and same length of time) time. Alternatively or additionally, the controller 100 can make this determination by determining if the pressure increases by at least 10%, (or another values such as at least 15%, at least 20%, at least 25%, at least 30%, at least 35%, at least 40%, at least 50%, at least 60%, at least 75% at least 100%, etc.) as compared to the mean pressure and the speed increases by at least 10% (or another value such as at least 5%, at least 15%, at least 25%, at least 50%) as compared with the mean torque during the corresponding time period.

The controller 100 can include various output devices, such as screens, video displays, monitors and the like that can be used to display information, warnings, data, such as text, numbers, graphics, icons and the like, regarding the status of the machine 10. The controller 100, including operator interface, can additionally include a plurality of input interfaces for receiving information and command signals from various switches and sensors associated with the rotary mixer machine 10 and a plurality of output interfaces for sending control signals to various actuators associated with the rotary mixer machine 10. Suitably programmed, the controller 100 can serve many additional similar or wholly disparate functions as is well-known in the art. As discussed previously, the controller can be configured to control the machine 10 to at least one of decouple the milling system 20 from being driven by the power source, activate a first actuator configured to raise the rotor relative to a surface of the working area or activate a second actuator to raise the frame relative to the surface thereby raising the rotor, in response to determining the rotor has encountered the object capable of damaging the rotor.

INDUSTRIAL APPLICABILITY

The present application describes various apparatuses, systems and methods for a rotary mixer machine 10 or cold planer machine. These can include a controller or method of monitoring and controlling that determines if the rotor has encountered an object capable of damaging the rotor. The disclosed apparatuses, system and methods can be used to protect components such as the rotor 22 and other parts of the milling system 20 (such as the drive member 29) and/or drive system 13 from damage, thereby providing cost savings and reducing down time for repair. For example, techniques disclosed herein include, when the controller 100 or method of monitoring and controlling determines the rotor has encountered an object capable of damaging the rotor various actions can automatically be taken. For example, the controller 100 can command a decoupling of the milling system from being driven by the power source, activate a first actuator configured to raise the rotor relative to a surface of the working area or activate a second actuator to raise the frame relative to the surface thereby raising the rotor.

This determination can be made using signal(s) from one or more sensors of the milling system 20 such as at least one pressure sensor 40, the at least one pulley sensor 38 and/or the torque sensor. The present inventors have recognized, as discussed above, for example, that a pressure in a drive member tension cylinder (indicative of tension on the drive member) drops (or in other configurations increases) when a torque spike is seen in the drive system. This is seen as region 104 in FIG. 3A, for example. A pressure spike (or drop in alternative configurations) is also seen just after the high torque event. This is seen at region 106 in FIG. 3A. These pressure changes can be used individually, together with one another, or in combination with other sensed criteria (e.g., sensed torque, sensed belt/pulley speed, sensed belt/pulley acceleration, etc.) to sense and identify a torque spike such that the actions discussed above can be commanded by the controller 100.

What is claimed is:

1. A machine for road work, the machine comprising:
   a frame;
   a drive system including a power source carried by the frame;
   a milling system driven by the power source, the milling system comprising:
   a rotor configured to rotate and remove an amount of material from a working area;
   a drive member coupling the rotor to be driven by the power source;
   a tensioner assembly configured to tension the drive member, wherein tensioner assembly includes a hydraulic cylinder; and
   an electronic sensor configured to measure the tension of the drive member by sensing a pressure of the hydraulic cylinder, wherein the electronic sensor transmits an electronic signal indicative of the pressure; and
   an electronic control module configured to, in response to the electronic signal received from the electronic sensor, perform an analysis of the electronic signal and determine if the rotor has encountered an object capable of damaging the rotor.

2. The machine of claim 1, wherein the pressure of the hydraulic cylinder decreases by 10% or more from a mean pressure when the rotor has initially encountered the object capable of damaging the rotor.

3. The machine of claim 2, wherein the, electronic control module determines if the rotor has encountered the object capable of damaging the rotor by one or more of:
   determining if the pressure increases by at least 25% as compared to the mean pressure; or
   determining if the pressure decreases by at least 5% as compared to the mean pressure and the pressure then increases by at least 20% as compared to the mean pressure within 0.2 seconds or less.

4. The machine of claim 1, further comprising a second electronic sensor configured to measure one of a speed of the drive member or a torque of the drive system.

5. The machine of claim 4, wherein the electronic control module is configured to, in response to the electronic signal received from the electronic sensor and an electronic signal received from the second electronic sensor, determine if the rotor has encountered the object capable of damaging the rotor based upon the electronic signals.

6. The machine of claim 5, wherein the electronic control module determines if the rotor has encountered the object capable of damaging the rotor by one or more of:
   determining if the torque increases by 50% or more as compared a mean torque and the pressure reduces by at least 10% as compared to a mean pressure within a same time frame; or
   determining if the speed of the drive member decreases by at least 10% as compared to a mean drive member speed and the pressure reduces by at least 10% as compared to the mean pressure within the same time frame.

7. The machine of claim 1, wherein the electronic control module is configured to control the machine to at least one of decouple the milling system from being driven by the power source, activate a first actuator configured to raise the rotor relative to a surface of the working area or activate a second actuator to raise the frame relative to the surface thereby raising the rotor, in response to determining the rotor has encountered the object capable of damaging the rotor.

8. A method of monitoring a rotor of a milling machine, the method comprising:
   providing a drive member coupling the rotor to be driven by a drive system of the milling machine;
   electronically sensing a pressure of a hydraulic cylinder indicative of a tension of the drive member;
   transmitting an electronic signal indicative of the pressure to an electronic control module; and
   determining, via analysis on the electronic signal by the electronic control module, if the rotor has encountered an object capable of damaging the rotor.

9. The method of claim 8, further comprising automatically controlling the milling machine by at least one of decoupling the drive member from being driven by the drive system, activating a first actuator configured to raise the rotor relative to a surface of a working area or activating a. second actuator to raise a frame relative to the surface thereby raising the rotor, in response to determining the rotor has encountered the object capable of damaging the rotor.

10. The method of claim 8, wherein determining if the rotor has encountered the object capable of damaging the rotor comprises one or more of:
    determining if the pressure decreases by at least 10% as compared to a mean pressure;
    determining if the pressure increases by at least 25% as compared to the mean pressure; or
    determining if the pressure decreases by at least 5% as compared to the mean pressure and the pressure then increases by at least 20% as compared to the mean pressure within 0.2 seconds or less.

11. The method of claim 8, further comprising sensing a speed of the drive member or a torque of the drive system, and the determining the rotor has encountered the object capable of damaging the rotor is based upon the electronic sensing the pressure and the sensing the speed of the drive member or the torque of the drive system.

12. The method of claim 11, wherein determining if the rotor has encountered the object capable of damaging the rotor based upon the electronically sensing the pressure and the sensing the speed of the drive member or the torque of the drive system comprises one or more of:
    determining if the torque increases by 50% or more as compared a mean torque and the pressure reduces by at least 10% as compared to a mean pressure within 0.2 seconds or less; or
    determining if the speed of the drive member decreases by at least 10% as compared to a mean drive member speed and the pressure reduces by at least 10% as compared to the mean pressure within 0.2 seconds or less.

13. A system comprising:
    a frame;
    a drive system including a power source;
    a milling system driven by the power source, the milling system comprising:
    a rotor configured to rotate and remove an amount of material from a working area;
    a belt configured to couple the rotor to be driven by the power source; and
    a first electronic sensor configured to measure a pressure of a hydraulic cylinder tensioning the belt, wherein the electronic sensor transmits an electronic signal indicative of the pressure: and
    an electronic control module configured to, in response to the electronic signal received from the first electronic sensor, perform an analysis of the electronic signal and determine if the rotor has encountered an object capable of damaging the rotor.

14. The system of claim 13, wherein the pressure of the hydraulic cylinder decreases by 10% or more from a mean pressure when the rotor has initially encountered an object capable of damaging the rotor.

15. The system of claim 14, wherein the electronic control module determines if the rotor has encountered the object capable of damaging the rotor by one or more of:
    determining if the pressure increases by at least 25% as compared to the mean pressure; or
    determining if the pressure decreases by at least 5% as compared to the mean pressure and the pressure then increases by at least 20% as compared to the mean pressure within 0.2 seconds or less.

16. The system of claim 13, further comprising a second electronic sensor configured to measure one of a speed of the belt or a torque of the drive system.

17. The system of claim 16, wherein the electronic control module is configured to, in response to the electronic signal received from the electronic sensor and an electronic signal received from the second electronic sensor, determine if the rotor has encountered the object capable of damaging the rotor based upon the electronic signals.

18. The system of claim 17, wherein the electronic control module determines if the rotor has encountered the object capable of damaging the rotor by one or more of:
    determining if the torque increases by 100% or more as compared a mean torque and the pressure reduces by at least 10% as compared to a mean pressure within 0.2 seconds or less; or
    determining if the speed of the belt decreases by at least 10% as compared to a mean belt speed and the pressure reduces by at least 10% as compared to a mean pressure within 0.2 seconds or less.

19. The system of claim 13, wherein the electronic control module is configured to at least one of decouple the milling system from being driven by the power source, activate a first actuator configured to raise the rotor relative to a surface of the working area or activate a second actuator to raise the frame relative to the surface thereby raising the rotor, in response to determining the rotor has encountered the object capable of damaging the rotor.

* * * * *